A. LOOMIS.
FOLDING SEAT.
APPLICATION FILED FEB. 15, 1909.

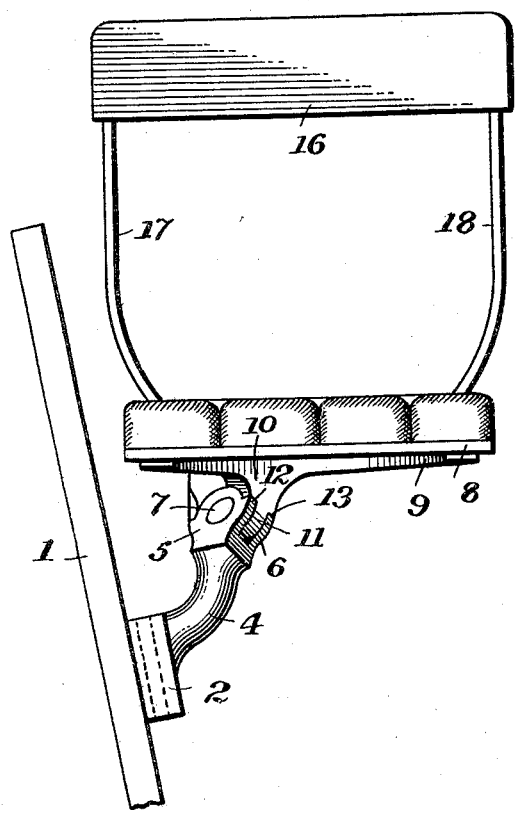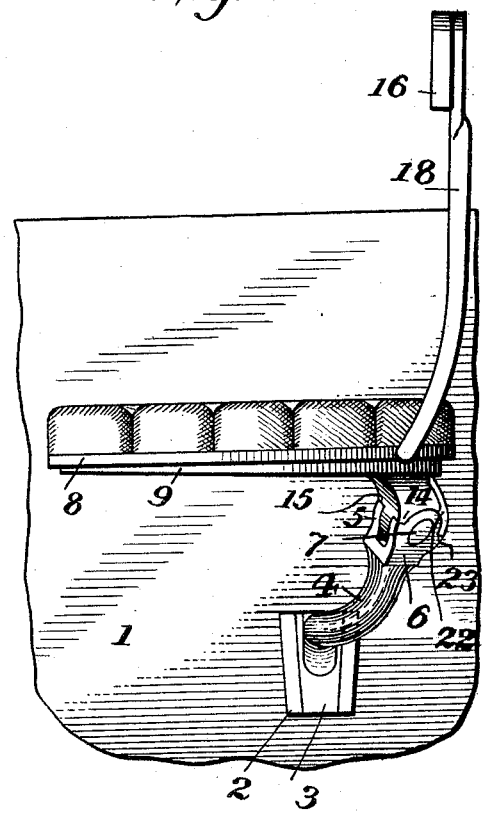

1,110,503.

Patented Sept. 15, 1914.
2 SHEETS—SHEET 2.

Witnesses
J. G. Hinkel
J. J. McCarthy

Inventor
Allen Loomis
By
Foster, Freeman, Watson & Coit
Attorneys

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

FOLDING SEAT.

1,110,503.  Specification of Letters Patent.  Patented Sept. 15, 1914.

Application filed February 15, 1909. Serial No. 478,033.

*To all whom it may concern:*

Be it known that I, ALLEN LOOMIS, a citizen of the United States, and resident of Detroit, in the county of Wayne and State of Michigan, have invented certain new and useful Improvements in Folding Seats, of which the following is a specification.

This invention relates to folding seats for automobiles.

Its objects are to simplify and improve the construction providing efficient means for securely holding the seat in operative position, and permitting it to be folded into inoperative position by a single turning movement.

Its advantages and the novel features thereof will be understood from the following description, taken in connection with the accompanying drawings.

Figure 3:
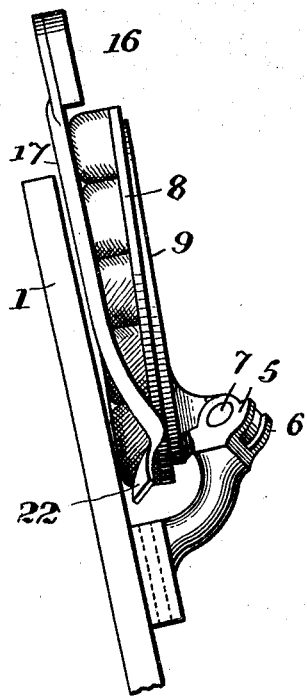
Figure 4:
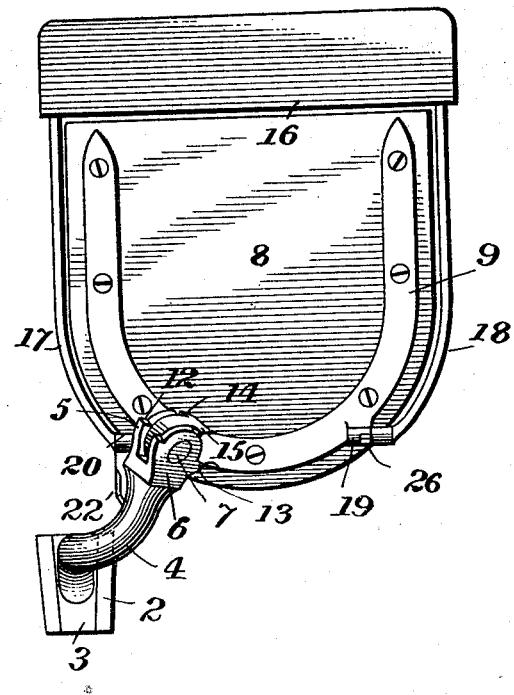
Figure 5:
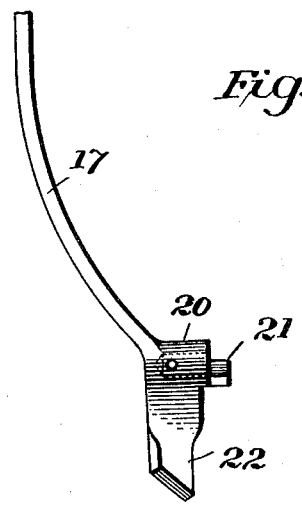

In the drawings, Figure 1 is a front view of the seat in operative position; Fig. 2 is a side view of the seat in the same position; Fig. 3 is a side view of the seat in folded position; Fig. 4 is a front view of the seat in folded position; and Fig. 5 is a detail view of a portion of one of the arms for supporting the back of the seat.

In the drawings, 1 represents a side panel of an automobile and it has thereon a tapering socket 2 adapted to receive the tapering lower end 3 of the supporting arm or bracket 4. This arm or bracket 4 extends upwardly and outwardly from the socket of the side panel, so as to support the seat at its upper end at a proper distance from the side panel. On the upper end of the arm 4 there is a pivot bearing composed of the separated ears 5, 6, which are provided with alined openings through which the pin 7 passes.

The seat 8 has the bottom iron 9 which is provided with the projection 10, having at its lower end a pivot bearing in the form of an ear 11 fitting between the ears 5 and 6 and provided with a central opening through which passes the pin 7. It will be observed by reference to the drawings that the pivot bearing is arranged diagonally to the seat both in its operative and inoperative position, and that its angle is such that the seat may be turned by a single motion from the position shown in Fig. 1, where it is horizontal, facing in the direction in which the vehicle is moving, to the position shown in Fig. 3, where it is against the side panel 1 with its front edge at the top and horizontal. The pivot bearing has been described as being "arranged diagonally," this term being intended to define the peculiar relation of the pivot axis to the seat and side wall of the vehicle body. Such axis it is to be noticed is inclined both transversely and longitudinally of the vehicle, or inclined to both the horizontal and vertical planes which intersect said axis at the upper end of the pivot. It will be observed that by this single turning operation the seat not only turns to a vertical position, but also turns horizontally, substantially 90°, thus lying close against the side panel. In other words, it is not necessary to first lower the seat and then turn it to face in the right direction, since all of this is accomplished by simply turning the seat on its pivot.

Comparing Figs. 1 and 4 it will be seen that the front edge of the seat extends horizontally both when in operative position and when folded or turned against the side of the vehicle. In the latter position such edge of the seat is uppermost and extends longitudinally of the vehicle.

In order to firmly support the seat when it reaches its horizontal position, the ears 5 and 6 are provided with front lugs 12, 13, which coöperate with lugs 14, 15 on the projection 10. The seat 8 is provided with a folding back composed of the cross piece 16 carried by the side arms 17, 18 which are pivotally secured to the iron 9 at 19, 20. These arms are provided with lugs 21 which coöperate with the seat to support the back in vertical position when the seat is horizontal. The arm 17 is furthermore provided with an extension 22 which projects beyond its pivot bearing 20 and engages the rear lug 23 on the arm 4 when the seat is in horizontal or operative position. It will be observed that the engagement of the extension 22 with the lug or stop 23 will not only assist in holding the back in upright position, but will also serve to lock the seat itself in horizontal position and prevent accidental displacement.

Having thus described the invention what is claimed is:

1. The combination with a side wall of a vehicle body, and a support attached to and projecting from the inner face of said wall, said support forming with the wall a space adapted to receive a seat, of a seat having a single pivotal connection with said support and when in position for use extending over a portion of said space, the connection between the support and seat permitting the latter to be turned by a single movement into a substantially vertical position in said space.

2. In a device of the class described, the combination with the side wall of a vehicle, of a support adjacent thereto, a seat having on its underside a pivotal connection with said support diagonally arranged with reference to said seat when upright and when horizontal, said connection being beneath the seat when the latter is horizontal and on the opposite side of the seat from the adjacent side wall of the vehicle when the seat is in upright position.

3. The combination with a side wall of a vehicle body, and a support attached to and projecting from the inner face of said wall, of a cushioned seat pivotally connected with said support and adapted by a movement about the axis of the pivotal connection with said support to be turned from operative position to substantially vertical position with its cushioned face adjacent the side wall of the vehicle body, and a back hinged to the seat and extending above the same when the parts are in folded position.

4. In a device of the class described, the combination with a wall, of a supporting arm secured thereto extending upwardly and outwardly therefrom, a diagonally arranged pivot bearing on the end of said arm, a seat, a diagonally arranged pivot bearing on said seat engaging and coöperating with the bearing on said arm, and coöperating stops on said bearings to support the seat in horizontal position.

5. In a device of the class described, the combination with a wall, of a supporting arm secured thereto extending upwardly and outwardly therefrom, a diagonally arranged pivot bearing on the end of said arm, a seat, a diagonally arranged pivot bearing on said seat engaging and coöperating with the bearing on said arm, coöperating stops on said bearings to support the seat in horizontal position, and a folding back for said seat having extensions engaging stops to support the back in vertical position when the seat is horizontal.

6. In a device of the class described, the combination with a support, of a pivot bearing at the top of said support provided with front and rear stops, a seat, a pivot bearing on said seat engaging and coöperating with the bearing on said support, stops on the front of said last mentioned bearing engaging the corresponding stops of the first mentioned bearing to support the seat horizontally, a folding back for said seat, and an extension on said back adapted to engage said rear stops to support the back vertically and to hold the seat in its horizontal position.

7. In a device of the class described, the combination with the side wall of a vehicle, of a socket thereon, a supporting arm adapted to removably fit said socket and extending upwardly and outwardly therefrom, a diagonally arranged pivot bearing at the end of said arm, a seat, and a diagonally arranged pivot bearing on said seat coöperating with the bearing on said arm.

8. The combination with a side wall of a vehicle body, and a support attached to and projecting from the inner face of said wall, of a seat connected with said support by a pivot the axis of which is inclined to said wall and to a vertical plane at right angles thereto whereby the seat may by a single movement be turned from operative position to substantially vertical position with its cushioned face adjacent said side wall of the vehicle.

9. In a folding seat adapted to be mounted upon the side wall of a vehicle, the combination with a seat-bottom, of a pair of coacting pivot members constituting means by which the seat-bottom is adapted to be swung to fold and unfold said seat, said pivot members being secured the one to said seat bottom and the other to said side wall, said pivot members extending at an acute angle downwardly, rearwardly and transversely from said seat bottom with respect to the seat in its operative position.

10. In a folding seat, the combination with a seat bottom, of a plate secured on the underside thereof at one of the rear corners of said seat bottom, said plate being provided with a pivot member inclined at an acute angle with respect to the plane of said seat bottom and across the corner thereof, a second pivot member coacting with said first mentioned pivot member, said second pivot member being inclined at its upper end forwardly with respect to the seat in its operative position and also toward the plane assumed by the seat in its folded position, and means for limiting the turning movement of the seat bottom about said second pivot member.

11. The combination with a seat bottom, of a pivot member rigidly mounted upon the underside of said seat bottom near one of the rear corners thereof, said pivot member projecting rearwardly with respect to the seat in its operative position at an acute angle from said seat bottom across said corner thereof, a bracket provided with a second pivot member coacting with said first mentioned pivot member and means for limiting the rotatable movement of said pivot members with respect to each other.

12. In a folding seat, the combination with a seat bottom, of a pin, and a sleeve in which said pin fits, said pin and sleeve being operatively associated with said seat bottom to form an axis of rotation for the same, said pin and sleeve both located rearwardly, downwardly and transversely of the underside of said seat-bottom with respect to the seat in its operative position.

13. The combination with a support, of a seat pivoted to said support and adapted to swing to and from a substantially horizontal position, a back pivoted to said seat and adapted to be swung from a substantially vertical position substantially into the plane of the seat, and locking means carried by said back and preventing the seat from being swung from its horizontal position while the back is in its vertical position.

14. The combination with a support, of a seat pivoted to said support and arranged to swing from a substantially horizontal plane to a substantially vertical plane at the side of the horizontal position and with the front and rear edges horizontally arranged, a back pivoted to said seat and adapted to swing from a substantially vertical position to a position substantially in the plane of the seat, and locking means carried by said back and preventing the seat from being swung from its horizontal position while the back is in its vertical position.

15. The combination of, a pivotally mounted seat, a back pivoted to said seat, and means carried by said back adapted to lock said seat against movement on its pivot while the back and seat are in their normal positions of use.

16. The combination with a support, of a seat pivoted thereto, a back pivoted to said seat, and means carried by said back and adapted to engage said support, when the support and back are in their normal positions of use, to lock said seat against movement on its back.

In testimony whereof I affix my signature in presence of two witnesses.

ALLEN LOOMIS.

Witnesses:
C. I. DALE,
E. N. HEARN.

---

Copies of this patent may be obtained for five cents each, by addressing the "Commissioner of Patents, Washington, D. C."